United States Patent
Kalbeck et al.

(10) Patent No.: US 10,808,690 B2
(45) Date of Patent: Oct. 20, 2020

(54) METHOD FOR THE START-UP CONTROL OF AN ELECTRIC VACUUM PUMP

(71) Applicant: Continental Automotive GmbH, Hanover (DE)

(72) Inventors: Alexander Kalbeck, Burglengenfeld (DE); Jürgen Schicke, Kelkheim (DE); Christian Märkl, Wald (DE)

(73) Assignee: Continental Automotive GmbH (DE)

( * ) Notice: Subject to any disclaimer, the term of this patent is extended or adjusted under 35 U.S.C. 154(b) by 1259 days.

(21) Appl. No.: 14/366,124

(22) PCT Filed: Nov. 27, 2012

(86) PCT No.: PCT/EP2012/073734
§ 371 (c)(1),
(2) Date: Jun. 17, 2014

(87) PCT Pub. No.: WO2013/092132
PCT Pub. Date: Jun. 27, 2013

(65) Prior Publication Data
US 2014/0356190 A1    Dec. 4, 2014

(30) Foreign Application Priority Data

Dec. 19, 2011    (DE) .................. 10 2011 088 974

(51) Int. Cl.
*F04B 49/02*    (2006.01)
*F04B 49/06*    (2006.01)
(Continued)

(52) U.S. Cl.
CPC .............. *F04B 49/02* (2013.01); *B60T 13/46* (2013.01); *F04B 49/06* (2013.01); *F04C 25/02* (2013.01);
(Continued)

(58) Field of Classification Search
CPC .. F04B 49/02; F04B 49/06; F04B 2201/0801; F04B 49/065; F04B 2203/0202;
(Continued)

(56) References Cited

U.S. PATENT DOCUMENTS 5,515,676 A * 5/1996 Earle .................. B60T 13/46
                                                        417/12
5,518,373 A * 5/1996 Takagi ................ F04B 49/06
                                                        417/12
(Continued)

FOREIGN PATENT DOCUMENTS

DE    196 47 940    5/1998
DE    299 19 386    1/2001
(Continued)

OTHER PUBLICATIONS

International Search Report corresponding to application No. PCT/EP2012/073734, dated Aug. 7, 2013.
(Continued)

*Primary Examiner* — Dominick L Plakkoottam
(74) *Attorney, Agent, or Firm* — RatnerPrestia

(57) ABSTRACT

The invention relates to a method for controlling a start-up of an electric vacuum pump for a vacuum system of a vehicle, wherein the start-up can occur according to at least two different start-up modes, i.e., according to a standard mode and according to at least one special mode, wherein in the standard mode the vacuum pump is connected to a supply voltage in a non-clocked manner and in the special mode the vacuum pump is connected to a supply voltage in a dynamically clocked manner.

21 Claims, 3 Drawing Sheets

(51) Int. Cl.
  *H02P 6/20* (2016.01)
  *F04C 25/02* (2006.01)
  *F04C 28/06* (2006.01)
  *B60T 13/46* (2006.01)
(52) U.S. Cl.
  CPC ............... *F04C 28/06* (2013.01); *H02P 6/20* (2013.01); *F04B 2201/0801* (2013.01); *F04C 2270/075* (2013.01); *F04C 2270/701* (2013.01)
(58) Field of Classification Search
  CPC .. F04B 2203/0205; F04C 28/06; F04C 25/02; F04C 2270/075; F04C 2270/701; H02P 6/20; H02P 6/18; H02P 21/32; H02P 27/08; B60T 13/46; B60T 13/52; B60T 17/22; B60T 17/221; B60T 8/4036; B60T 8/885
  USPC .................................. 417/44.11; 123/DIG. 5
  See application file for complete search history.

(56) References Cited

U.S. PATENT DOCUMENTS

| | | | |
|---|---|---|---|
| 5,944,159 A | 8/1999 | Schneider et al. | |
| 6,422,183 B1* | 7/2002 | Kato | F01M 3/02 123/73 AD |
| 7,475,951 B2* | 1/2009 | Ichikawa | B60K 6/543 188/356 |
| 7,834,565 B2* | 11/2010 | Armstrong | H02P 6/28 318/254.1 |
| 8,398,376 B2* | 3/2013 | Hope | F04C 28/28 417/12 |
| 2001/0035757 A1 | 11/2001 | Maeckel et al. | |
| 2003/0057914 A1* | 3/2003 | Kamatsu | B60L 11/1803 318/727 |
| 2005/0163622 A1* | 7/2005 | Yamamoto | F04B 37/14 417/44.1 |
| 2006/0158028 A1* | 7/2006 | Ichikawa | B60K 6/543 303/114.3 |
| 2007/0162782 A1 | 7/2007 | Eickhoff et al. | |
| 2009/0015061 A1 | 1/2009 | Kotschenreuter et al. | |
| 2010/0163327 A1* | 7/2010 | Bernier | B62M 27/02 180/190 |
| 2010/0168978 A1* | 7/2010 | Schubert | B60T 13/72 701/76 |
| 2011/0174244 A1* | 7/2011 | Maki | F01P 5/12 123/41.1 |
| 2012/0253574 A1* | 10/2012 | Krueger | B60T 8/4036 701/22 |
| 2012/0262101 A1* | 10/2012 | Rudich | H02P 7/29 318/400.42 |
| 2013/0283898 A1* | 10/2013 | Rollinger | G01M 3/025 73/114.77 |

FOREIGN PATENT DOCUMENTS

| | | |
|---|---|---|
| DE | 100 11 404 | 9/2001 |
| DE | 100 21 479 | 11/2001 |
| DE | 103 44 460 | 4/2005 |
| DE | 10 2007 032 960 | 1/2009 |
| JP | H07-167072 | 4/1995 |
| JP | 08295230 | 11/1996 |
| JP | 2000125587 | 4/2000 |
| JP | 2006044314 | 2/2006 |
| KR | 20060119487 A | 11/2006 |

OTHER PUBLICATIONS

German Search Report corresponding to application No. DE 10 2011 088 974.4, dated Oct. 5, 2012.
Korean Decision for Grant of Patent for Korean Application No. 10-2014-7020289, dated Jan. 4, 2019, with translation, 4 pages.

* cited by examiner

METHOD FOR THE START-UP CONTROL OF AN ELECTRIC VACUUM PUMP

CROSS REFERENCE TO RELATED APPLICATION

This application is the U.S. National Phase Application of PCT International Application No. PCT/EP2012/073734, filed Nov. 27, 2012, which claims priority to German Patent Application No. 10 2011 088 974.4 filed Dec. 19, 2011, the contents of such applications being incorporated by reference herein.

FIELD OF THE INVENTION

The invention relates to a method for controlling the start-up process of an electric vacuum pump for a vacuum system of a vehicle.

BACKGROUND OF THE INVENTION

Electric vacuum pumps (vacuum pumps) are known from the prior art and said vacuum pumps replace or complement in vehicles (passenger cars) the conventional methods (vacuum by means of motor suction in the case of petrol motors or rather by means of mechanical vacuum pumps in the case of diesel motors). Said vacuum is necessary in the vehicles inter alia for the purpose of supporting or enhancing the braking force.

One of the reasons for using an electric vacuum supply system is a clearly lower consumption of energy since the pump energy is only provided when the vacuum is actually required.

For safety reasons, it is necessary for the vacuum to be available at all times in the electric vacuum supply system just as in the case of other systems. It is therefore necessary to be able to operate the electric vacuum pump correctly at all times, this includes in particular during a vacuum pump start-up process.

Different dynamic behavior of the vacuum pump start-up process can occur as a result of different general requirements.

By way of example, in specific situations the vacuum pump can start-up "sluggishly", which as a result of the electric control process leads to the start-up process consuming an increased amount of power. This in turn leads to an increased release of thermal energy in the controlling electronic unit (for example relay box, ECU, . . . ).

It is necessary to take into consideration said dissipation of energy whilst designing the construction of the controlling electronic unit (component selection, circuit board layout) but also whilst designing the supply system (by way of example generator, battery, supply lines).

Current systems provide the components or rather the supply system for the "worst case scenario". However, this means:
a) high costs as a result of the increased demands on the components and
b) reduced service life as a result of increased operational demands.

SUMMARY OF THE INVENTION

Therefore an aspect of the invention provides a method for controlling the start-up process of an electric vacuum pump, and whilst consuming a small as possible amount of energy in the start-up phase said method does not place any significantly increased demands on the components for the purpose of controlling the vacuum pump during the start-up process.

Alternatively, a start-up process of the electric vacuum pump in a standard mode or at least in a special mode is provided in accordance with an aspect of the invention.

The standard mode corresponds to the normal operation in which the vacuum pump is connected to a supply voltage without a particular control, regulation or pulsing process.

However, in the special mode, the vacuum pump is not continuously connected to the supply voltage, rather said vacuum pump is connected in a pulsed manner, in other words periodically in intervals. An (on average) clearly lower consumption of power is therefore achieved during the start-up process of the vacuum pump than during a start-up process in the standard mode.

The selection between the two start-up modes is conducted in accordance with an aspect of the invention with reference to environmental parameters (by way of example temperature) and/or operating parameters of the vacuum (by way of example previous idle time period).

If said parameters would lead to a start-up process in the standard mode with an undesirably high consumption of power, the special mode (or one of the special modes) is selected rather than the normal mode for the start-up process and, as a consequence, the consumption of power is reduced with respect to the standard mode.

The energy that is used is clearly reduced by means of this method in accordance with the invention, however the vacuum pump system is simultaneously loaded in such a manner that the vacuum system for example heats up and returns to the normal operating parameters.

In accordance with embodiments of the invention, derived parameters can be advantageously used as environmental parameters and/or operating parameters, wherein said parameters can be used individually but also in combinations:

A start-up process is implemented in the special mode if:
a) the temperature of the vacuum pump is lower than a threshold value $T\_p$,
b) the temperature of the ECU or rather of the electronic control unit (motor control/vacuum pump motor control) is lower than a threshold value $T\_e$,
c) the temperature of a power driver or power drivers for the purpose of controlling the vacuum pump is higher than a threshold value $T\_l$,
d) the idle time period of the vacuum pump is longer than a threshold value $T\_sz$,
e) wake-up management information indicates that the vacuum pump has not yet been operated after waking up or after a clamp change,
f) the ambient temperature is lower than a threshold value $T\_u$,
g) the prevailing start-up speed in the case of a vacuum pump start is below a threshold value $V\_p$,
h) the measured vacuum is below a threshold value $p\_vac\_th$,
i) the prevailing vacuum gradient in the case of a vacuum pump start is above a threshold value $p\_vac\_grad\_th$.

The following parameters in particular are used as relevant parameters for the selection of the mode for the start-up process of the vacuum pump: temperature of the vacuum pump, temperature of the ECU, temperature of the power driver, idle time period of the vacuum pump, wake-up management information, ambient temperature, start-up speed of the vacuum pump (determined for example by means of a Hall sensor or a model for example by means of a prevailing power consumption of the vacuum pump or rather a vacuum pump power), measured vacuum, gradient of the vacuum. All of these mentioned conditions can be linked in a user defined manner (and/or).

It is to be noted that the vacuum is to be considered as negative for all of these considerations, in other words a higher vacuum means a higher pressure difference with respect to the ambient pressure and a negative vacuum gradient means an increase in vacuum.

In accordance with further embodiments of the invention, the respective threshold values are also extended where necessary in different stepped threshold values that lead in each case to different start-up modes.

Different combinations of the conditions can lead to different start-up modes.

In accordance with further advantageous embodiments of the invention, the special mode is to be exited as soon as:
  a) a control process of the vacuum pump has already been implemented in the special mode for a period of T_enh,
  b) an indication in the system indicates that the vacuum pump is running within normal parameters for example by means of vacuum pump rotational speed, prevailing power, current curve, vacuum pump temperature, vacuum/vacuum gradient, and/or
  c) a requirement of the vacuum pump start-up process is no longer present. [This section has been revised according to the priority document].

All the above mentioned conditions can be linked in a user-defined manner (and/or).

The vacuum pump start-up control process (the term control can always also refer to regulation) is selected depending upon the respective selected special mode. It is to be assumed that the vacuum pump is always activated in a simple manner in the standard (for example static interconnection of the power electronics).

In the special mode, it is advantageously possible in accordance with further advantageous embodiments of the invention to selectively connect the power electronics in a dynamic manner (pulsed) as follows:
  a) a pattern of on/off cycles having in each case defined times T_on and T_off is controlled during a defined start-up period t_a;
  b) the times T_on and T_off can be varied in dependence upon environmental conditions, the time T_on can be advantageously varied depending upon the supply voltage, by way of example an operating voltage in an electrical on-board network of the vehicle, (by means of a linear dependence or a characteristic field) in such a manner that T_on is extended in the case of lower operating voltages;
  c) T_off can be varied on the basis of the prevailing measured vacuum pump current or rather the power driver temperature; and/or
  d) the times T_on and T_off can be varied depending upon the duration of the previous start-up process or rather the control curve, it is thus advantageously possible as the time T increases after the commencement of the vacuum pump activation process to increase the time T_on and to decrease the time T_off, wherein the total duration T_on+T_off can likewise be variable.

In accordance with a further advantageous embodiment of the invention, the specified time is established by way of a model and/or a characteristic field.

In accordance with a further advantageous embodiment of the invention, the scale of the times T_on or rather T_off lies in the region of second or rather 100 ms.

In accordance with a further advantageous embodiment of the invention, in the case of a special mode being selected (vacuum pump is not running at full power/available vacuum is insufficient), information for the vehicle driver or rather an acoustic, optical or combined warning, by way of example an indication in the instrument dashboard, acoustic gong or warning light, is to be output for safety reasons.

In accordance with a further advantageous embodiment of the invention, in the case of a special mode being selected (vacuum pump is not running at full power/available vacuum is insufficient), higher-ranking vehicle drive systems are to be informed for safety reasons, so that these change into a type of emergency program (for example reducing engine torque, increasing braking pressure in the master cylinder by means of a hydraulic pump, gear restriction in automatic transmissions etc).

As a consequence, the method in accordance with the invention for controlling the start-up process of an electric vacuum pump renders it possible to construct the dimensions of the electronics, which control the vacuum pump, in a more cost-effective, space saving, energy efficient manner that is not dependent upon temperature without reducing the functional capability of the vacuum pump. The service life of the components is simultaneously increased as a consequence of the reduced loading.

The invention renders it possible to achieve a simple control process while considering parameters in such a manner that creates no additional costs for hardware and at the same time technical features of the automobile industry, for example EMC values, are kept within an operating range.

BRIEF DESCRIPTION OF THE DRAWINGS

Some exemplary embodiments of the invention are further described hereinunder with reference to the drawing, in which.

DETAILED DESCRIPTION OF THE PREFERRED EMBODIMENT

Figure 1:
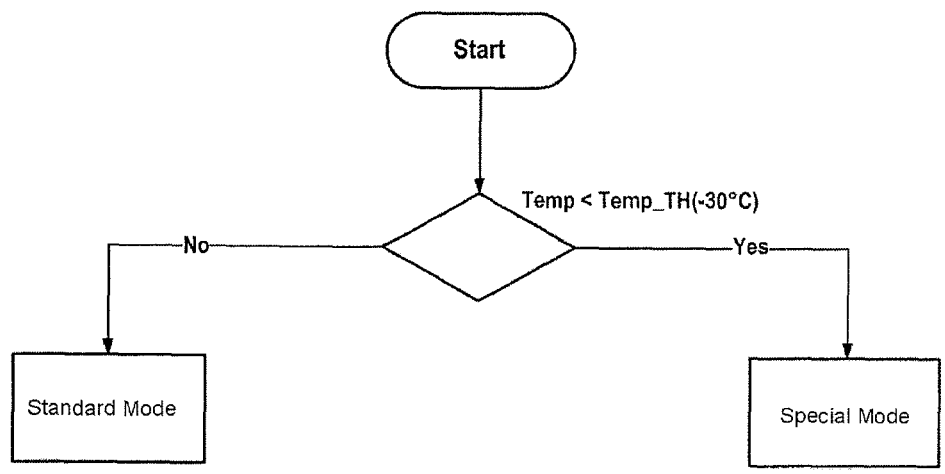
FIG. 1 illustrates an exemplary flow diagram for a one-step selection between a standard mode and a special mode.

FIG. 1 illustrates in an exemplary manner a flow diagram for a one-step selection in accordance with the invention between a standard mode and a special mode for the purpose of controlling the start-up process of an electric vacuum pump for the purpose of generating a vacuum in a vacuum system of a vehicle and said electric vacuum pump is not illustrated in the figure.

In order to avoid the vacuum pump consuming an undesirably large amount of energy during the start-up process, said electric vacuum pump can be driven alternatively in a standard mode that corresponds to the normal operating mode of the vacuum pump or said electric vacuum pump can be driven in at least one special mode that is optimized so as not to allow the electrical energy consumption of the vacuum pump in the start-up phase to become undesirably large and in which special mode the vacuum pump is connected in a pulsed manner to an electrical energy source.

In accordance with an aspect of the invention, environmental parameters and/or operating parameters of the vacuum pump are drawn upon for the purpose of selecting said modes during the start-up process of the vacuum pump.

A simple example having a special mode is illustrated in FIG. 1. In this example, prior to starting the vacuum pump, the ambient temperature is established and compared with a threshold value (in this case −30 degrees Celsius). If the actual temperature is higher than this threshold value, a start-up process of the vacuum pump is implemented in the standard mode in which standard mode the vacuum pump is connected to the electrical energy source in a non-pulsed manner.

However, if the measured temperature lies below the said threshold value, it is thus to be expected that the vacuum pump consumes a particularly large amount of power during the start-up process. The operating mode is therefore switched into a special mode in which the vacuum pump is connected in a start-up phase to an electrical energy source in a pulsed manner. This leads to on average lower consumption of power in the start-up phase than if the vacuum pump were to be started in the standard mode.

Multiple start-up modes having different parameters of the pulsing process can be provided where necessary.

Figure 2:
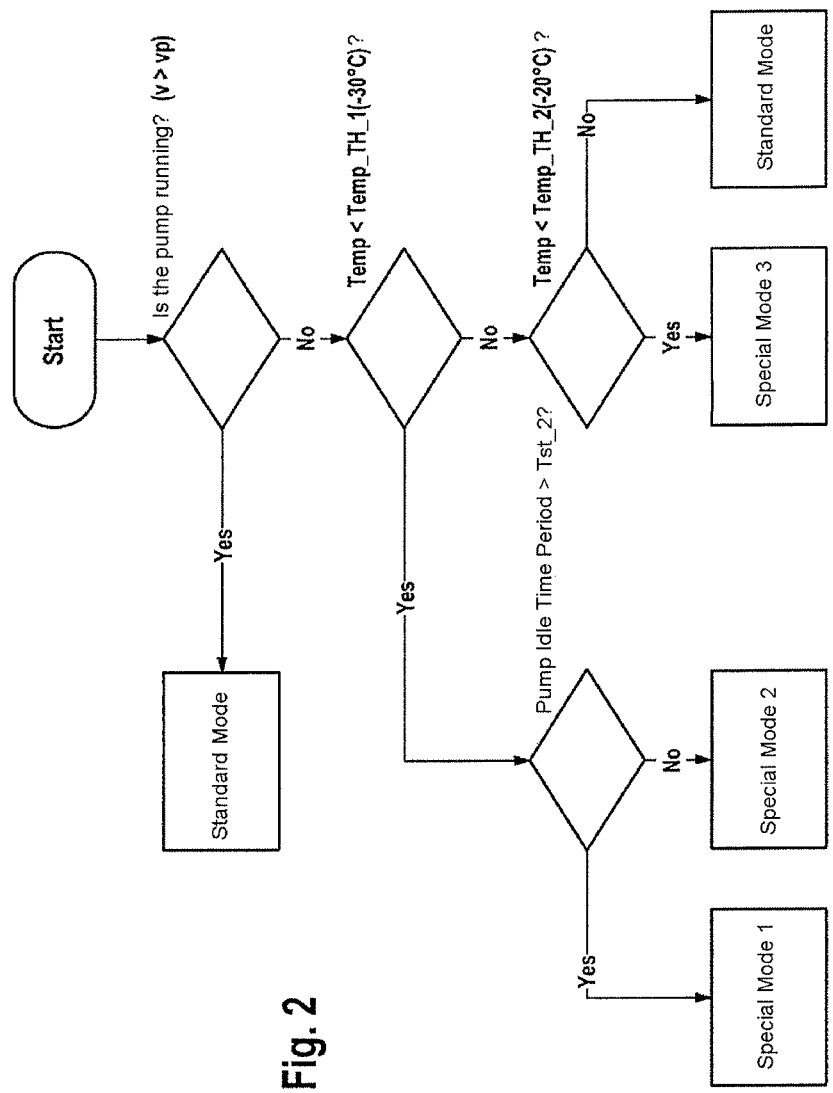
FIG. 2 illustrates an exemplary flow diagram for a multi-step selection between a standard mode and multiple start-up modes.

An example of this type is illustrated in FIG. 2. In this case, a selection is made by way of multiple decisions with reference to environmental parameters and/or operating parameters of the vacuum pump between three different start-up modes (having different pulse periods) and a standard mode in order to achieve a further improved adaption to the conditions that arise during the start-up process of the vacuum pump and also to achieve an even more precise limitation of the start-up power.

If the vacuum pump is already running, then the standard mode is selected. If said vacuum pump is not running, a start-up process of the vacuum pump is therefore to be implemented and it is initially established, similar to the example in accordance with FIG. 1, whether the ambient temperature is lower or higher than a threshold value (in this case −30 degrees Celsius).

If the actual temperature is lower than this threshold value, it is thus established in a further decision step whether the idle time period of the vacuum pump has amounted to longer than a predefinable time. If this is the case, a special mode 1 is selected, otherwise a special mode 2 is selected.

If the actual temperature is higher than the threshold value −30 degrees Celsius, it is thus established in a further decision step whether the ambient temperature is lower or higher than a second threshold value (in this case −20 degrees Celsius). If this is the case, a special mode 3 is selected, otherwise a start-up process in the standard mode is implemented.

The start-up modes 1 to 3 are designed in this case in such a manner that the manner in which the vacuum pump is pulsed in the special mode 1 is designed in such a manner that the vacuum pump is connected to the energy source during relatively short pulse periods, whereas the vacuum pump is connected in the special mode 3 to the energy source during relatively longer pulse periods. An average pulse period is selected in the special mode 2.

The pulse periods during which the vacuum pump is connected to the energy source can therefore be selected to be different and can also be variable.

Figure 3:
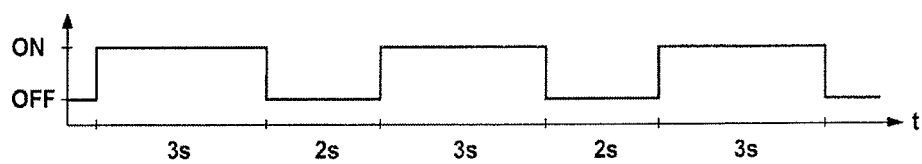
FIG. 3 illustrates an exemplary temporal curve for a pulsed energy supply of the vacuum pump in a special mode.
Figure 4:
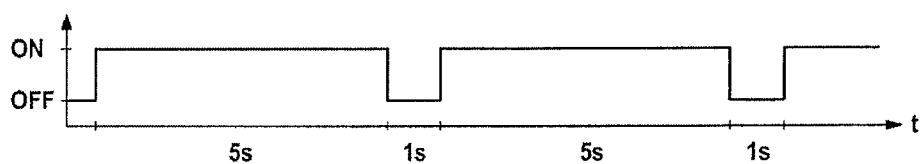
FIG. 4 illustrates an illustration corresponding to FIG. 3 with a different exemplary special mode having different pulse periods.
Figure 5:
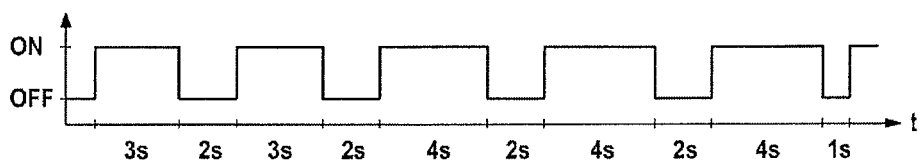
FIG. 5 illustrates an illustration corresponding to FIG. 3 with a different exemplary special mode having variable pulse periods.

The temporal pulse period curves in FIGS. 3 to 5 illustrate some examples of this.

FIG. 3 illustrates in an exemplary manner a pulse curve of a special mode with respect to time. During the (positive) pulse, the vacuum pump is connected in a start-up process to an energy source, however it is not connected to said energy source during the low phases. As a consequence, it is achieved that the vacuum pump on average consumes a smaller amount of power than if said vacuum pump were to be permanently connected to the energy source.

FIG. 4 illustrates a temporal curve corresponding to that illustrated in FIG. 3, however with somewhat longer phases during which the vacuum pump is switched on. A special mode of this type could for example then be selected if the environmental parameters and/or operating parameters of the vacuum pump indicate that a lower start-up power is expected than that indicated by the parameters which prevail in the special mode in accordance with FIG. 3.

The switched-on periods in the pulsing process can also be variable and/or can be modified in dependence upon time.

FIG. 5 illustrates an example of this type. In this case, the switched-on periods in the course of the start-up process are always longer. This is by way of example then advantageous if the temperature of the vacuum pump during the start-up process is initially very low and during the course of the start-up process is successively increased.

The examples in FIGS. 1 to 5 illustrate that it is possible to tailor the method in accordance with the invention for the start-up process of a vacuum pump in a very variable manner to suit the prevailing structural and environmental conditions.

The invention claimed is:

1. A method for controlling a start-up process of an electric vacuum pump for a vacuum system of a vehicle, wherein the start-up process is implemented in two different start-up modes, namely in a standard mode and in a special mode, comprising:
   selecting between the standard mode and the special mode based on a determination that the electric vacuum pump would consume an amount of power greater than a predetermined value during the start-up process,
   when in the standard mode, the vacuum pump is started up by connecting the vacuum pump to a supply voltage in a non-pulsed manner, and
   when in the special mode, the vacuum pump is started up by connecting the vacuum pump to the supply voltage with on/off pulses, with the on/off pulses having in each case defined times T_on and T_off which together form a pulse period, wherein the times T_on and T_off are varied based on a predetermined relationship between values of T_on and T_off and environmental conditions and/or operating parameters, the variation of the times T_on and T_off resulting in a variation of a length of respective pulse periods.

2. The method as claimed in claim 1, wherein the start-up process of the vacuum pump is conducted in the special mode if a temperature of the vacuum pump is lower than a threshold value T_p.

3. The method as claimed in claim 1, wherein the start-up process of the vacuum pump is conducted in the special mode if a temperature of an electronic control unit (ECU) is lower than a threshold value T_e.

4. The method claim 1, wherein the start-up process of the vacuum pump is conducted in the special mode if a temperature of the power driver of the electronic control device is higher than a threshold value T_1.

5. The method as claimed in claim 1, wherein the start-up process of the vacuum pump is conducted in the special mode if an idle time period of the vacuum pump is longer than a threshold value T_sz, wherein the idle time period immediately precedes with respect to time a point in time of the start-up process.

6. The method as claimed in claim 1, wherein the start-up process of the vacuum pump is conducted in the special mode if wake-up management information indicates that the vacuum pump has not yet been operated after a wake-up process or after a clamp change.

7. The method as claimed in claim 1, wherein the start-up process of the vacuum pump is conducted in the special mode if an ambient temperature is lower than a threshold value T_u.

8. The method as claimed in claim 1, wherein the start-up process of the vacuum pump is conducted in the special mode if a prevailing start-up speed/rotational speed during a start-up process of the vacuum pump is lower than a threshold value v_p.

9. The method as claimed in claim 1, wherein the start-up process of the vacuum pump is conducted in the special mode if a vacuum that is measured in the vacuum system is lower than a threshold value p_vac_th.

10. The method as claimed in claim 1, wherein the start-up process of the vacuum pump is conducted in the special mode if a prevailing change in a vacuum that is measured in the vacuum system during the start-up process of the vacuum pump is higher than a threshold value p_vac_grad_th.

11. The method as claimed in claim 1, wherein multiple different start-up process modes are used,
if the environmental conditions and/or operating parameters are below or exceed stepped threshold values and/or predefinable combinations of the threshold values.

12. The method as claimed in claim 1, wherein the special mode is abandoned as soon as:
a process of controlling the vacuum pump in the special mode is already implemented during a time period T_enh, and/or
information indicates that the vacuum pump is running within predetermined parameters, with reference to the values of vacuum pump rotational speed, prevailing power/current curves, vacuum pump temperature, vacuum/vacuum gradient.

13. The method as claimed in claim 1, wherein the times T_on and T_off are established by a model or a characteristic field.

14. The method as claimed in claim 1, wherein the times T_on are approximately a few seconds and the times T_off are approximately a few hundred milliseconds.

15. The method as claimed in claim 1, wherein in the case of an activated special mode information for the vehicle driver is output after a predefinable period of time and said information is an acoustic and/or optical warning.

16. The method as claimed in claim 1, wherein in the case of an activated special other drive systems of the vehicle are informed after a predefinable period of time so that said systems switch into an emergency program.

17. The method as claimed in claim 1, wherein the determination that the electric vacuum pump would consume an amount of power greater than the predetermined value during the start-up process is based on the environmental conditions and/or operating parameters of the vacuum pump.

18. A method for controlling a start-up process of an electric vacuum pump for a vacuum system of a vehicle, wherein the start-up process is implemented in at least two different start-up modes, namely in a standard mode and in at least one special mode, comprising:
selecting between the standard mode and the at least one special mode based on a determination that the electric vacuum pump would consume an amount of power greater than a predetermined value during the start-up process,
when in the standard mode, connecting the vacuum pump to a supply voltage in a non-pulsed manner, and
when in the at least one special mode, connecting the vacuum pump to the supply voltage in a dynamically pulsed manner,
wherein during a defined start-up process period t_a a process of controlling the vacuum pump is performed according to a pattern of the ON/OFF pulses having in each case defined times T_on and T_off, wherein the times T_on and T_off are varied in dependence upon environmental conditions, and
wherein the time T_on is selected in dependence upon a value of the supply voltage, wherein T_on is selected in the case of smaller supply voltage values for a longer period of time than in the case of higher supply voltage values.

19. A method for controlling a start-up process of an electric vacuum pump for a vacuum system of a vehicle, wherein the start-up process is implemented in at least two different start-up modes, namely in a standard mode and in at least one special mode, comprising:
selecting between the standard mode and the at least one special mode based on a determination that the electric vacuum pump would consume an amount of power greater than a predetermined value during the start-up process,
when in the standard mode, connecting the vacuum pump to a supply voltage in a non-pulsed manner, and
when in the at least one special mode, connecting the vacuum pump to the supply voltage in a dynamically pulsed manner,
wherein during a defined start-up process period t_a a process of controlling the vacuum pump is performed according to a pattern of the ON/OFF pulses having in each case defined times T_on and T_off, wherein the times T_on and T_off are varied in dependence upon environmental conditions, and
wherein the time T_on is selected in a variable manner in dependence upon a prevailing measured vacuum pump power and/or a temperature of a motor of the vacuum pump.

20. A method for controlling a start-up process of an electric vacuum pump for a vacuum system of a vehicle, wherein the start-up process is implemented in at least two different start-up modes, namely in a standard mode and in at least one special mode, comprising:
selecting between the standard mode and the at least one special mode based on a determination that the electric vacuum pump would consume an amount of power greater than a predetermined value during the start-up process,
when in the standard mode, connecting the vacuum pump to a supply voltage in a non-pulsed manner, and
when in the at least one special mode, connecting the vacuum pump to the supply voltage in a dynamically pulsed manner, wherein during a defined start-up process period t_a a process of controlling the vacuum pump is performed according to a pattern of the ON/OFF pulses having in each case defined times T_on and T_off, wherein the times T_on and T_off are varied in dependence upon environmental conditions, and wherein the time T_off is selected in a variable manner in dependence upon a prevailing measured temperature of the electronic control unit (ECU) T_e and/or a temperature of a motor of the vacuum pump.

21. A method for controlling a start-up process of an electric vacuum pump for a vacuum system of a vehicle, wherein the start-up process is implemented in at least two different start-up modes, namely in a standard mode and in at least one special mode, comprising:

selecting between the standard mode and the at least one special mode based on a determination that the electric vacuum pump would consume an amount of power greater than a predetermined value during the start-up process, when in the standard mode, connecting the vacuum pump to a supply voltage in a non-pulsed manner, and when in the at least one special mode, connecting the vacuum pump to the supply voltage in a dynamically pulsed manner, wherein during a defined start-up process period t_a a process of controlling the vacuum pump is performed according to a pattern of the ON/OFF pulses having in each case defined times T_on and T_off, wherein the times T_on and T_off are varied in dependence upon environmental conditions, and wherein the times T_on and T_off are varied in dependence upon a prevailing duration of the start-up process, wherein the time T_on is increased with the increasing time T after the commencement of the start-up process and the time T_off is shortened, wherein the total time T_on+T_off is variable.

* * * * *